United States Patent
Pasztor et al.

(10) Patent No.: US 6,512,822 B2
(45) Date of Patent: Jan. 28, 2003

(54) METHOD AND ARRANGEMENT FOR MEASURING HOLDING TIME IN COMMUNICATION NETWORKS

(75) Inventors: Attila Pasztor, Budapest (HU); Adám Magi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 09/903,875

(22) Filed: Jul. 13, 2001

(65) Prior Publication Data

US 2002/0042261 A1 Apr. 11, 2002

(30) Foreign Application Priority Data

Jul. 18, 2000 (NO) ................................. 003682

(51) Int. Cl.⁷ ............................................. H04M 15/00
(52) U.S. Cl. .................. 379/134; 379/111; 379/112.01; 379/112.06; 379/266.06
(58) Field of Search ............................ 379/111, 112.01, 379/112.04, 112.05, 112.06, 133, 134, 137, 139, 265.1, 265.14, 266.01, 266.03, 266.06, 266.1; 370/232, 234

(56) References Cited

U.S. PATENT DOCUMENTS

| | | | |
|---|---|---|---|
| 4,200,771 A | | 4/1980 | Kraushaar et al. |
| 4,979,118 A | * | 12/1990 | Kheradpir .................... 364/436 |
| 5,325,292 A | | 6/1994 | Crockett ...................... 364/401 |
| 5,612,949 A | * | 3/1997 | Bennett ........................ 370/253 |
| 5,727,051 A | * | 3/1998 | Holender ..................... 379/112 |
| 5,764,740 A | * | 6/1998 | Holender ..................... 379/112 |
| 5,923,742 A | * | 7/1999 | Kodialam et al. .......... 379/133 |
| 6,275,572 B1 | * | 8/2001 | Higuchi et al. ............. 379/111 |
| 6,298,123 B1 | * | 10/2001 | Nolting et al. .............. 379/112 |
| 6,304,639 B1 | * | 10/2001 | Malomsoky et al. ..  379/112.04 |
| 6,385,301 B1 | * | 5/2002 | Nolting et al. ........... 379/32.01 |
| 6,404,738 B1 | * | 6/2002 | Reininger et al. .......... 370/236 |
| 6,411,681 B1 | * | 6/2002 | Nolting et al. ................ 379/34 |

OTHER PUBLICATIONS

*Operations Research Letters* 24 (1999) 205–212, Aug. 28, 1997, Revision: Jan. 19, 1999, Ward Whitt, AT&T Labs–Research, "Dynamic Staffing In a Telephone Call Center Aiming to Immediately Answer All Calls".

*IEEE*, 1999, Yetik Serbest and San–qi Li, "Unified Measurement Functions for Traffic Aggregation and Link Capacity Assessment".

* cited by examiner

*Primary Examiner*—Binh Tieu
(74) *Attorney, Agent, or Firm*—Nixon & Vanderhye, PC

(57) ABSTRACT

The present invention relates to a method for measuring holding time in a communication network. Using traffic volume and call attempt number measurements from earlier measurement intervals as well as the current interval makes it possible to calculate the holding time parameters of the calls generated during the current interval in a much more accurate way. The method can be incorporated into performance management systems or any other systems or tools post-processing measurement results from network elements. As examples three practical implementations are described.

11 Claims, 3 Drawing Sheets

METHOD AND ARRANGEMENT FOR MEASURING HOLDING TIME IN COMMUNICATION NETWORKS

The present invention relates to measurements of holding time in communication networks, for use in tools for management and planning of the network.

BACKGROUND

Traffic volume, call attempt number and holding time measurements are the basic measurements performed in telecommunication networks. These parameters provide the operators with invaluable information about the network status.

These measurements form the basis of capacity planning and element dimensioning of these networks.

Measurement methods and systems used today were designed for networks carrying predominantly voice traffic. In today's networks the characteristics of the traffic have changed to that extent that some of the preconditions assumed has became obsolete. As a result of this some measurement results are incorrect. This poses a big problem because statistics based on these misleading results are used as basis for decisions about the future investments into the networks and operation and maintenance issues.

STATE OF THE ART

The above mentioned key parameters are measured in network elements using event counters. The measurements are performed in fixed time intervals. However there are performance parameters, which are not easy to measure directly.

One of these parameters is the holding time. Network elements today provide measurement results of the average holding time during the measurement interval, but in fact this value is calculated from the traffic and call attempt counter values for the given interval.

Another way to get these statistics is to process data in the charging databases. Some operators use traffic statistics from these databases, but this solution has several shortcomings. Data stored in the charging database are confidential and strategically sensitive. Also the processing of these large amounts of data is expensive and can not be performed continuously to have up to date statistics on a minute or even daily basis.

PROBLEM

As it was mentioned previously the holding time parameter is calculated based on the traffic and call attempt counters. Basically the following formula is used:

$$H_i = A_i / I_i$$

where:
 $H_i$: is the holding time
 $A_i$: is the traffic
 $I_i$: is the call intensity (number of call attempts per time unit)
 i: index of the measurement interval For example lets assume a 30 minutes long measurement interval, 180 Erlang's measured by the traffic counter and 3600 call attempts counted during this interval. Based on the above formula this gives us 90 seconds holding time, as the call intensity is 2 calls per second (3600 call attempts divided by the length of the measurement interval).

In the next example lets assume again 30 minutes long measurement interval and 180 Erlang's traffic measured, but the call attempt counter value now is only 36. The above formula gives us in this case 9000 seconds holding time. How could we measure 9000 seconds holding time in 1800 seconds long measurement interval?

The problem with this value is that it is calculated based on the traffic and call attempt counters only from one measurement interval. The assumption that the traffic measured during a measurement interval is generated by the call attempts arriving during that interval is invalid. If we assume 36 call attempts generated at the beginning of the measurement interval and calls not terminated before the end of the interval the resulting traffic is 36 Erlang's. This means that 36 call attempts can not generate more traffic than 36 Erlang's during the measurement interval irrespective of the holding time.

The explanation of the above problem is that large portion of the measured traffic was generated by call attempts from the previous measurement intervals. The above formula is correct if the traffic generating process gets into a quasi stationary state in considerably shorter time than the length of the measurement interval.

Another practical problem is that in real life the traffic seems to change its characteristics so fast that it can not settle into a stationary state. This means that the above formula can not be used to obtain correct measurement results for example from links carrying traffic towards Internet service providers.

BRIEF SUMMARY OF THE PRESENT INVENTION

It is an object of the present invention to produce a method and arrangement for measuring holding time in a communication network which avoids the shortcomings of the traditional method. Using traffic volume and call attempt number measurements from earlier measurement intervals as well it is possible to calculate the holding time parameter of the calls generated during the current interval in a much more accurate way.

While the error of the traditional way of measuring holding time depends not only on the confidence of traffic and call attempt measurements but also on the characteristics of the holding time profile of the users, the method according to the present invention is affected mainly by the confidence of the traffic and call attempt measurements.

A further object of the invention is to produce a method and arrangement for measuring holding time that cope with fast changing characteristics of the traffic in a communication net.

Other objects of the invention are to implement the above-described method into performance management systems or any other systems or tools postprocessing measurement results from network elements.

The objects described above are achieved in a method, arrangement and various fields of use as described in the appended patent claims.

DETAILED DESCRIPTION OF THE INVENTION

The invention will now be described in detail in reference to the appended drawings.

Figure 1:
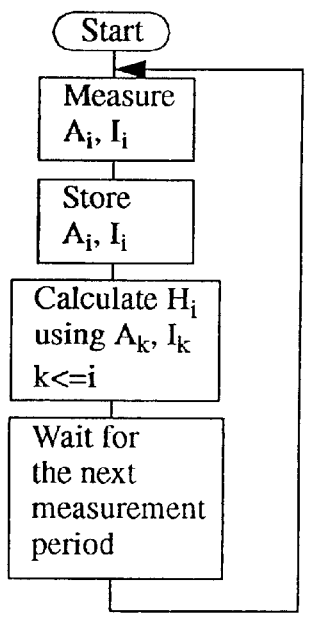
FIG. 1 is a schematic flow diagram showing the various steps involved in performing the inventive method.

FIG. 1 shows an algorithm for calculation of the holding time, H, in a network according to the present invention.

The traffic measured during the current interval consists of two components:

$$\overline{A}_j = \overline{G}_j + \overline{R}_j$$

where:

$\overline{A}_j$: is the traffic measured during the $j^{th}$ interval
$\overline{G}_j$: is the traffic generated by call attempts during the $j^{th}$ interval
$\overline{R}_j$: is the traffic remaining from earlier intervals If we assume that $A_j^s(t)$ is the number of circuits occupied by calls which were generated during the $j^{th}$ interval, then:

$$\overline{G}_j = \frac{1}{T} \int_0^T A_j^s(t) dt$$

where:

$T$: is the length of the measurement period $\overline{G}_j$: is the traffic generated by call attempts during the $j^{th}$ interval is the length of the measurement period
is the traffic generated by call attempts during the interval
As it was mentioned beforehand $\overline{G}_j$ is the average value of the traffic (number of occupied circuits) generated by calls arriving during $j^{th}$ period at the end of the $j^{th}$ period. The value of the traffic level at the end of the $j^{th}$ period is:

$$G_j = A_j^s(T)$$

The amount of traffic remaining from the previous intervals can be calculated in the following way:

$$\overline{R}_j = \sum_{i=j-1}^{-\infty} \overline{R}_{i,j}$$

where $\overline{R}i,j$ is the average traffic from the $i^{th}$ interval remaining in the $j^{th}$ interval. It can be calculated in the following way:

$$\overline{R}_{i,j} = \frac{1}{T} \int_{(j-i-1)T}^{(j-i)T} A_i^e(t) dt$$

where:

$A_i^e(t$: is the number of occupied circuits by calls generated during the $i^{th}$ interval after the end of the $i^{th}$ interval As $A_i^e(t)$ and $A_j^s(t)$ are functions of holding time and call intensity and $\overline{A}_j$ and call intensity values are known from measurements the above formulae can be used to obtain the holding time value with a proper mathematical method.

If we for example assume that the interarrival time and the holding time has exponential distribution then:

$$A^s j(x) = I_j H_j \left(1 - e^{-\frac{x}{H_j}}\right)$$

$$A^e j(x) = G_j e^{-\frac{x}{H_j}}$$

As a result of this:

$$\overline{A}_j = \overline{G}_j + \overline{R}_j$$

$$\overline{R}_j = \sum_{i=j-1}^{-\infty} \overline{R}_{i,j}$$

$$\overline{G}_j = I_j H_j \left(1 - \frac{H_j}{t}\left(1 - e^{-\frac{t}{H_j}}\right)\right)$$

$$\overline{G}_j = I_j H_j \left(1 - e^{-\frac{t}{H_j}}\right)$$

$$\overline{R}_{i,j} = G_i \frac{H_i}{t}\left(e^{-\frac{(j-i-1)t}{H_i}} - e^{-\frac{(j-i)t}{H_i}}\right)$$

$$i < j$$

We can use iteration to find the value of $H_j$. This way it is possible to get much more accurate holding time values than with the traditional method.

Figure 5:
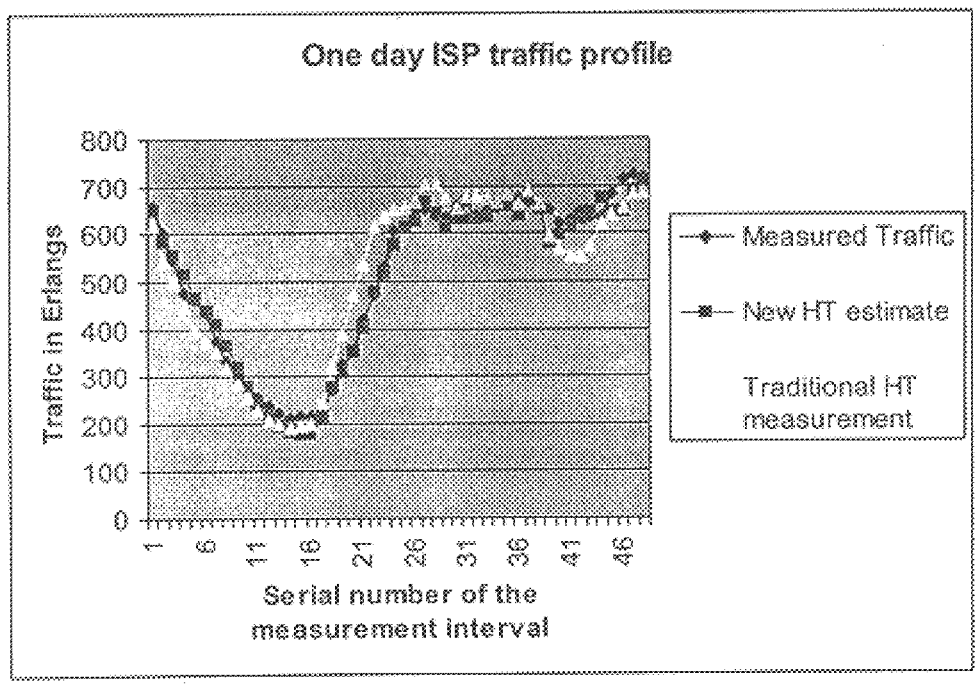
FIG. 5 shows two different ways of implementing the invention in network planning and design tools.

The chart in FIG. 5 demonstrates some results achieved using this method. Traffic profile, call attempt and holding time measurement results were collected from a real network route connecting an ISP to the local exchange. The chart shows the measured traffic profile, the traffic profile regenerated based on the traditional holding time measurement method and the traffic profile based on holding time calculated based on the method described in this document.

The above-described method could be incorporated into performance management systems or any other systems or tools post-processing measurement results from network elements.

The input parameters of the module implementing the method are the results of the traffic measurements (traffic [Erlang] and call intensity [calls/sec]) based on the traditional counter-based collection of network statistics. The output of the module is the corrected holding time parameter.

Figure 2:
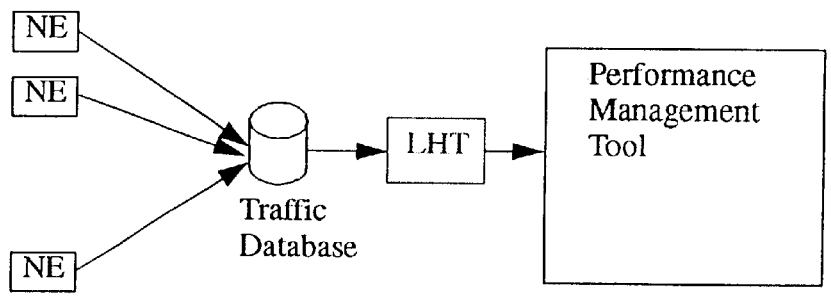
FIG. 2 is a chart, which demonstrates some results achieved using the present invention.

As examples three practical implementations are described below:
Network Management—Performance Management Tool
Network Element—Statistics
Network Planning and Dimensioning Tool A. Network Management—Performance Management Tool FIG. 2 contains a simple functional chart describing the general architecture of performance management tools. The NE boxes represents the network elements collecting the network statistics. The results of these measurements are collected into a Traffic Database from where the application processing and displaying the results can access the statistics. The picture also shows the place of the LHT module in this architecture.

The above implementation of the method provides the users of performance management systems with corrected holding time statistics while the network elements (switches) remain unchanged.

B Network Element—Statistics

Another possible implementation is to perform the correction of the statistics at the network element. This implementation allows the interface of the network element to remain unchanged while providing corrected statistics for the other applications polling the network element.

The method can be implemented as integrated part of the network element's statistical module or it can be an external module attached to the network element.

Figure 3:
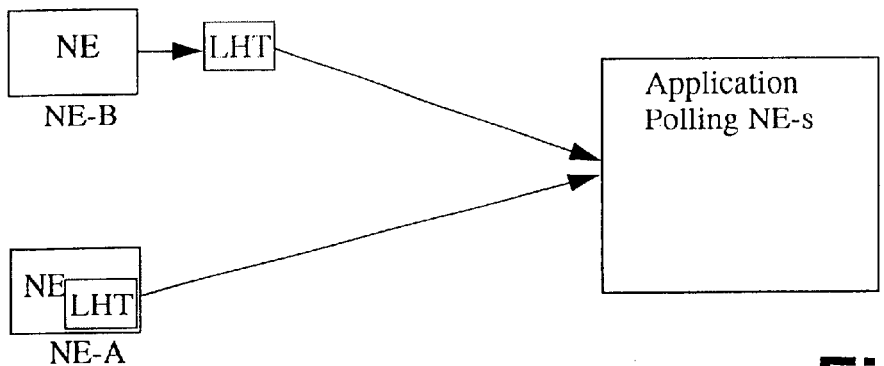
FIG. 3 is a functional chart showing the invention implemented in a general performance management tool.
Figure 4:
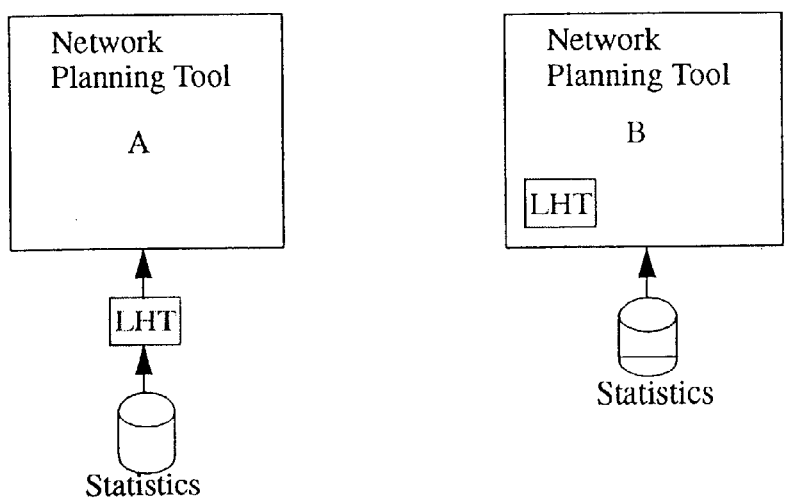
FIG. 4 is a chart showing the invention implemented in a network element.

FIG. 3 demonstrates these possibilities.

In the figure NE-A represents a network element containing the integrated implementation of the method and NE-B is a network element having an external device implementing the method and correcting the statistics.

C. Network Planning and Design Tool

Besides network management tools network planning applications also make intensive use of statistics collected from network elements. Thus incorporating the method into these tools can provide the users with valuable additional information.

Similarly to the implementation of the method at network elements the method can be either integrated into these tools or can be implemented as an external module. In the later case the input network statistics should be pre-processed by the LHT module before feeding them to the planning application.

FIG. 5 demonstrates these concepts:

The planning tool A is using LHT as an external pre-processing module and planning tool B has an integrated implementation of the method.

What is claimed is:

1. Method for measuring holding time in a communications network which includes several network elements, characterised in that the method includes:

measuring the traffic volume with first event counters installed in each network element, and which count the number of circuits occupied by calls in a measurement interval storing said measurement in memory means repeating said measurement during subsequent intervals computing the holding time for a given interval from traffic measurements from said interval and the previous intervals and measurements of call intensity obtained from second event counters counting the number of call attempts during said given interval.

2. Method as claimed in claim 1, characterised in that the holding time, $H_j$, for a given interval, j, is calculated from the relationship:

$$H_j = (\overline{A_j} - \overline{R_j})/I_j$$

where $\overline{A_j} = \overline{G_j} + \overline{R_j}$ is the average value of the traffic measured during the $j^{th}$ interval, $\overline{G_j}$ is the traffic generated by call attempts during the $j^{th}$ interval, $$\overline{G_j} = \frac{1}{T} \int_0^T A_j^s(t) dt,$$

where $A_j^s(t)$ is the number of circuits occupied by calls generated during the $j^{th}$ interval, $\overline{R_j}$ is the average value of the traffic remaining from earlier intervals, $I_j$ is the call intensity measured as the number of call attempts counted during the $j^{th}$ interval.

3. Method as claimed in claim 2, characterised in that $\overline{R_j}$ is computed as $$\overline{R_j} = \sum_{i=j-1}^{-\infty} \overline{R_{i,j}}$$

where $\overline{R_{i,j}}$ is the average traffic from the $i^{th}$ interval remaining in the $j^{th}$ interval, and $$\overline{R_{i,j}} = \frac{1}{T} \int_{(j-i-1)T}^{(j-i)T} A_i^e(t) dt$$

where $A_i^e(t)$ is the number of circuits occupied by calls generated during the $i^{th}$ interval after the end of the $i^{th}$ interval.

4. Method as claimed in claim 3, characterised in that $A_j^s(t)$ and $A_i^e(t)$ are given as:

$$A_j^s(t) = I_j H_j \left(1 - e^{-\frac{t}{H_j}}\right)$$

$$A_j^e = G_j e^{-\frac{t}{H_j}}.$$

5. Use of the method claimed in claim 1 in a network management-performance management tool.

6. Use of the method claimed in claim 1 in a statistical module of a network element.

7. Use of the method claimed in claim 1 in an external module attached to a network element for supplying statistical data.

8. Use of the method claimed claim 1 in a network planning and design tool.

9. Arrangement for measuring holding time in a communications network, in which the network includes several network elements, each network element includes means for measuring the traffic volume in said element, by counting the number of circuits occupied by calls in a measurement interval, each network element further includes means for measuring the call intensity in said element, by counting the number of call attempts in the measurement interval, and means for computing the holding time in said network element, characterised in that the arrangement is adapted to store said traffic measurements from said measurement interval in a memory, repeat the traffic measurements during subsequent intervals, and compute the holding time for a given interval from traffic measurements in the given interval and traffic measurements from a number of previous intervals and measurements of call intensity in the given interval.

10. Arrangement as claimed in claim 9, characterised in that the computing means is adapted to calculate the holding time, $H_j$, for a given interval, j, from the relationship:

$$H_j = (\overline{A_j} - \overline{R_j})/I_j$$

where $\overline{A_j} = \overline{G_j} + \overline{R_j}$ is the average value of the traffic measured during the $j^{th}$ interval, $\overline{G_j}$ is the call intensity during the $j^{th}$ interval, $$\overline{G_j} = \frac{1}{T} \int_0^T A_j^s(t) dt,$$

where $A_j^s(t)$ is the number of circuits occupied by calls generated during the $j^{th}$ interval, $\overline{R_j}$ is the average value of the traffic remaining from earlier intervals, $I_j$ is the call intensity measured as the number of call attempts counted during the $j^{th}$ interval.

11. Arrangement as claimed in claim 10, characterised in that said computing means are adapted to compute $\overline{R_j}$ as $$\overline{R_j} = \sum_{i=j-1}^{-\infty} \overline{R_{i,j}}$$

where $\overline{R_{i,j}}$ is the average traffic from the $i^{th}$ interval remaining in the $j^{th}$ interval, and $$\overline{R_{i,j}} = \frac{1}{T}\int_{(j-i-1)T}^{(j-i)T} A_i^e(t)\,dt$$

where $A_i^e(t)$ is the number of circuits occupied by calls generated during the $i^{th}$ interval after the end of the $i^{th}$ interval.

* * * * *